United States Patent [19]

Oshima et al.

[11] Patent Number: 5,324,780

[45] Date of Patent: Jun. 28, 1994

[54] CORE-SHELL POLYMER, RESIN COMPOSITION AND MOLDED ARTICLE THEREOF

[75] Inventors: Junji Oshima, Toyonaka; Tatsuo Fujii, Nagaokakyo; Minoru Yamada, Kawanishi, all of Japan

[73] Assignee: Takeda Chemical Industries, Ltd., Osaka, Japan

[21] Appl. No.: 37,534

[22] Filed: Mar. 26, 1993

Related U.S. Application Data

[63] Continuation of Ser. No. 596,088, Oct. 11, 1990, abandoned.

[30] Foreign Application Priority Data

Oct. 14, 1989 [JP] Japan .................. 1-267843

[51] Int. Cl.$^5$ .................................................. C08L 77/00
[52] U.S. Cl. .................................. 525/66; 525/902
[58] Field of Search .......................................... 525/66

[56] References Cited

U.S. PATENT DOCUMENTS

| | | | |
|---|---|---|---|
| 3,668,274 | 6/1972 | Owens et al. | 260/857 |
| 4,086,300 | 4/1978 | Owens et al. | 525/66 |
| 4,172,861 | 10/1979 | Li et al. | 525/28 |
| 4,306,040 | 12/1981 | Baer | 525/310 |

FOREIGN PATENT DOCUMENTS

| | | |
|---|---|---|
| 0051471 | 5/1982 | European Pat. Off. . |
| 0259097 | 3/1988 | European Pat. Off. . |
| 55-135157 | 10/1980 | Japan . |
| 57-34153 | 2/1982 | Japan . |

*Primary Examiner*—Ana L. Carrillo
*Attorney, Agent, or Firm*—Wenderoth, Lind & Ponack

[57] ABSTRACT

The invention thus provides a core-shell polymer comprising a core phase which is rubbery polymer and a shell phase which is a glassy polymer with an unsaturated dicarboxylic acid or its mono-alkyl ester as a constituent thereof, wherein the toluene-soluble fraction of the core-shell polymer accounts for not more than 10% by weight.

It also provides polyamide resin compositions comprising said core-shell polymer and molded articles produced by molding said compositions.

The resin compositions and molded articles which comprises the core-shell polymer as an impact modifier have good features, especially a high impact strength at temperature ranging from room temperature to −30° C.

12 Claims, No Drawings

CORE-SHELL POLYMER, RESIN COMPOSITION AND MOLDED ARTICLE THEREOF

This application is a continuation of now abandoned application Ser. No. 07/596,088, filed Oct. 11, 1990, now abandoned.

This invention relates to a core-shell polymer capable of providing polyamide resins or polyamide-containing polymer alloy systems with impact resistance and to compositions containing such resins or systems with good impact strength provided by said core-shell polymer. It provides materials suited for use in the fields of automobiles, OA (office automation) apparatus and household electric and electronic appliances, among others.

BACKGROUND OF THE INVENTION

Polyamide resins have excellent thermal deformation resistance, rigidity and oil resistance and are used in electric appliance parts and automobile parts. Further improvement in impact strength and water resistance is desired, however.

As regards the impact strength, in particular, various attempts have already been made, including, more specifically, the use of ABS resins and modified polyolefins.

On the other hand, impact modifiers of the core-shell polymer type have been proposed, with a rubbery polymer as the core and a glassy polymer as the shell. Impact modifiers of this kind show good dispersibility in resins and it is relatively easy to attain reproducibility from the morphology viewpoint.

A core-shell polymer for improving the impact strength of polyamide resins has already been proposed in U.S. Pat. No. 3,668,274, which polymer contains carboxyl groups in the shell phase. Compositions composed of this carboxyl-modified core-shell polymer and nylon 6 indeed show good notched Izod impact strength values (thickness: ⅛ inch) at temperatures not lower than 23° C. but still have problems: the impact strength improving effect is low and the melt viscosity is high. The latter fact offers a problem from the moldability viewpoint. Furthermore, said impact modifier shows a very poor improving effect in nylon 66.

DETAILED DESCRIPTION OF THIS INVENTION

The present inventors made intensive investigations in search of a core-shell polymer capable of providing a polyamide resin composition with good impact strength and as a result, found that the above problems can be solved by melt-blending a core-shell polymer having the constitution mentioned below with a polyamide resin. Based on this finding, they have now completed the present invention.

The invention thus provides a core-shell polymer comprising a core phase which is rubbery polymer and a shell phase which is a glassy polymer with an unsaturated dicarboxylic acid or its mono-alkyl ester as a constituent thereof, wherein the toluene-soluble fraction of the core-shell polymer accounts for not more than 10% by weight. It also provides polyamide resin compositions comprising said core-shell polymer and molded articles produced by molding said polyamide resin composition.

The core-shell polymer according to the invention can be produced by continuous multistep seed emulsion polymerization which essentially consists in covering of the polymer obtained from a preceding polymerization step with another polymer in the succeeding step.

Thus, in the first step polymerization, a core phase consisting of a rubbery polymer having a glass transition temperature not higher than −30° C. is formed by polymerization of a conjugated diene monomer or an alkyl acrylate monomer containing 2 to 8 carbon atoms in the alkyl moiety, or a mixture of such monomers. If the core has a glass transition temperature above −30° C., the impact strength at low temperature may be unsatisfactory in certain instances.

As such conjugated diene, there may be mentioned, for instance, butadiene, isoprene, chloroprene, etc. Among them, butadiene is particularly preferred.

As the alkyl acrylate with 2 to 8 carbon atoms in the alkyl moiety, there may be mentioned for example, ethyl acrylate, propyl acrylate, butyl acrylate, cyclohexyl acrylate, 2-ethylhexyl acrylate, etc. In particular, butyl acrylate is preferred.

In the first step polymerization, the conjugated diene(s) and/or alkyl acrylate(s) may be copolymerized with a monomer or monomers copolymerizable therewith, for example aromatic vinyl or aromatic vinylidene compounds, such as styrene, vinyltoluene, α-methylstyrene, etc.; vinyl cyanide or vinylidene cyanide compounds, such as acrylonitrile, methacrylonitrile, etc.; and alkyl methacrylates, such as methyl methacrylate, butyl methacrylate, etc.

In cases where no conjugated diene is involved in the first step polymerization or a conjugated diene or dienes are involved in said step only in an amount of not more than 20% based on the total monomer amount in the first step, the higher impact strength at low temperature can be attained by using a crosslinking monomer and a grafting monomer each in a small amount.

As the crosslinking monomer, there may be mentioned, for example, aromatic divinyl monomers, such as divinylbenzene, etc.; and alkane polyol acrylates and alkane polyol methacrylates, such as ethylene glycol diacrylate, ethylene glycol dimethacrylate, butylene glycol diacrylate, butylene glycol dimethacrylate, hexanediol diacrylate, hexanediol dimethacrylate, oligoethylene glycol diacrylate, oligoethylene glycol dimethacrylate, trimethylolpropane diacrylate, trimethylolpropane dimethacrylate, trimethylolpropane triacrylate, trimethylolpropane trimethacrylate, etc. Particularly preferred are butylene glycol diacrylate and hexanediol diacrylate.

As the grafting monomer, there may be mentioned, among others, unsaturated carboxylic acid allyl esters, such as allyl acrylate, allyl methacrylate, diallyl maleate, diallyl fumarate, diallyl itaconate, etc. In particular, allyl methacrylate is preferred.

Such crosslinking monomer and grafting monomer are used each in an amount within the range of 0.01 to 5% by weight, preferably 0.1 to 2% by weight, based on the total monomer amount for the core.

The core phase should preferably account for 50 to 90% by weight based on the core-shell polymer as a whole. When the amount of the core phase is outside this weight range, namely below 50% or above 90%, the effect of improving the impact strength of resin compositions obtained by melt blending the resulting core-shell polymer with polyamide resins may be unsatisfactory in some instances.

In the second step of polymerization, a carboxyl-containing shell phase is formed using an unsaturated dicarboxylic acid or its mono-alkyl ester as a constituent. Thus, in said step, a glassy polymer with a glass transition temperature not lower than 40° C. is formed by copolymerizing an unsaturated dicarboxylic acid or its mono-alkyl ester and a monomer or monomers copolymerizable therewith. When the shell phase has a glass transition temperature below 40° C., handling of the core-shell polymer may become very difficult in the steps of removal of water and drying to melt-blending with resins due to the tackiness of said polymer, hence may become impracticable. The shell phase should preferably have a glass transition temperature not lower than 60° C.

As said unsaturated dicarboxylic acid, there may be mentioned, for instance, maleic acid, fumaric acid, iraconic acid, citraconic acid, mesaconic acid, aconitic acid, methylenemalonic acid, α-methyleneglutaric acid, etc. In particular, iraconic acid is preferred. Its monoalkyl ester contains a alcohol residue having 1 to 6 carbon atoms, for example, monoethyl maleate, etc.

The unsaturated dicarboxylic acid or its mono-alkyl ester is used in an amount within the range of 1 to 40% by weight, preferably 1 to 20% by weight, based on the shell weight.

As the copolymerizable monomers for shell formation by polymerization, there may be mentioned, among others, alkyl acrylates, such as ethyl acrylate and butyl acrylate, alkyl methacrylates, such as methyl methacrylate and butyl methacrylate, aromatic vinyl or vinylidene compounds, such as styrene, vinyltoluene and α-methylstyrene, vinyl or vinylidene cyanides, such as acrylonitrile and methacrylonitrile, and other polymerizable vinyl monomers. Particularly preferred among them are methyl methacrylate, styrene and acrylonitrile.

This shell phase should preferably account for 10 to 50% by weight based on the core-shell polymer as a whole. When the amount of this shell phase is outside the above range, namely below 10% or above 50%, the impact strength of the resin compositions obtained by melt-blending the product core-shell polymer with polyamide resins may not show any satisfactory improvement in some instances.

In this invention, each of a core and a shell can be composed of a multiple phases. It is necessary that the most-outer phase of a shell contains carboxyl groups.

The carboxyl groups contained in the shell may be in the form of —COOH or in the form of an ordinary salt, for example an alkali metal, alkaline earth metal or ammonium salt.

The core-shell polymer according to the invention can be isolated, in a granular, flake or powder form, from the latex produced according to a known seed emulsion polymerization method, by subjecting said latex to freezing and thawing or salting out and then subjecting the obtained polymer to removal of water by centrifugation and drying, or by filtration the said latex at vaccum or positive pressure.

The core-shell polymer can be recovered from the latex also by spray drying using a spray drier.

Furthermore, the core-shell polymer thus isolated may be subjected to dehydration treatment by various methods, for example heat treatment in a drier in an inert gas atmosphere, heat treatment by passing through an extruder, or application of a dehydrating agent, whereby said core-shell polymer can be converted to the form in which the carboxyl groups in the shell at least partly occur in the acid anhydride form.

The average particle size of the core-shell polymer produced in the above manner and suited for general use is within the range of 100 to 1,000 nm, preferably 120 to 750

The toluene-soluble fraction of this core-shell polymer should desirably be not more than 10% by weight, preferably not more than 8% by weight, more preferably not more than 5% by weight, based on the whole weight of said polymer.

When the toluene-soluble fraction is in excess, a shell phase separation from a core phase may occur at low temperatures and/or only an unsatisfactory impact strength may be obtained.

The polyamide resin compositions according to the invention are obtained by melt-blending 3 to 40% by weight, preferably 5 to 25% by weight, based upon the whole polyamide resin composition, of the above-mentioned core-shell polymer with polyamide resins.

When the amount of said impact modifier is below 3% by weight, the resulting resin compositions can hardly show any substantially improved impact strength, as the case may be. When said amount exceeds 40% by weight, the resulting resin compositions may have markedly impaired rigidity and heat resistance.

As the polyamide resins to be used in the practice of the invention, there may be mentioned, for example, aliphatic polyamides, such as polyamide 6, polyamide 6.6, polyamide 6.10, polyamide 11, polyamide 12, and polyamide 6.12, aromatic polyamides, such as polyhexamethylenediamine terephthalamide and polyhexamethylenediamine isophthalamide, and mixtures of or copolymers based on two or more of these. Polyamide 6 and polyamide 6.6 are preferred, however.

Polyamide resins are sometimes melt-blended with other resins, such as ABS resins or modified polyolefin resins, to give polymer alloys. In such case, further improved impact strength at low temperature can be attained by melt-blending the impact modifier according to the invention with the polymer alloys. Melt-blending with such polymer alloys of course falls within the scope of the present invention.

The amount of the core-shell polymer according to the invention in this case is also in the range of 3 to 40% by weight based upon the polymer compositions, preferably 5 to 25% by weight.

The polyamide resin compositions are produced by melt-blending. The melt-blending is generally performed in the range of 200° C. to 300° C. at which the resins are meltted and a viscosity may not be excessively low. For polyamide 6, for instance, said temperature range is 230° C. to 260° C.

The melt-blending can be effected using a heating roll, Banbury mixer, or single- or twin-screw extruder.

Furthermore, the resin compositions according to the invention may contain various additives each in an appropriate amount. As such additives, there may be mentioned, for instance, flame retardants, mold release agents, weather resistance modifiers, antioxidants, antistatic agents, thermal resistance modifiers, colorants, reinforcing agents, surfactants, inorganic fillers, and lubricants.

The polyamide resin compositions obtained by melt-blending the core-shell polymer according to the invention can provide polyamide resin molded articles showing high impact strength at temperatures ranging from room temperature to −30° C. Such high impact strength cannot have ever been attained with the conventional carboxyl-modified core-shell polymers.

The core-shell polymer, which is converted to the form in which the carboxyl groups in the shell at least partly occur in the acid anhydride form, has more feature.

Furthermore, polyamide resin compositions in which the conventional carboxyl-modified core-shell polymers are used have a very high melt viscosity, so that their moldability is very poor, whereas the polyamide resin composition which contain the core-shell polymer according to the invention show a viscosity suited for their molding.

In addition, the dicarboxylic acid-modified coreshell polymer according to the invention gives such high impact strength to polyamide 6.6 as has never been achieved with the conventional carboxylic acid-modified core-shell polymers.

The polyamide resin compositions according to the invention show excellent impact strength at low temperature because they have low ductile-brittle temperature and high notched Izod impact strength values in the brittle fracture region.

EXAMPLES AND COMPARATIVE EXAMPLES

The following examples and comparative examples are further illustrative of the present invention but are by no means limitative of the scope of the invention. In the examples and comparative examples, "part(s)" always means "part(s) by weight". In the examples and comparative examples, the following abbreviations are used:

| | |
|---|---|
| Butadiene | Bd |
| Ethyl acrylate | EA |
| n-Butyl acrylate | BA |
| 2-Ethylhexyl acrylate | 2EHA |
| Methyl methacrylate | MMA |
| Styrene | St |
| Methacrylic acid | MAA |
| Fumaric acid | FA |
| Itaconic acid | IA |
| Monoethyl Maleate | MAME |
| Allyl methacrylate | AlMA |
| Allyl maleate | AlMl |
| 1,4-Butylene glycol diacrylate | BGA |
| 1,6-Hexanediol diacrylate | HGA |
| Deionized water | DIW |
| Dioctyl sulfosuccinate sodium salt | SSS |
| Sodium dodecyl biphenyl ether sulfonate | DBES |
| Sodium persulfate | SPS |
| Cumene hydroperoxide | CHP |
| Sodium formaldehydesulfoxylate | SFS |
| Ethylenediaminetetraacetic acid sodium salt | EDTA |
| Sodium hydrogen carbonate | SHC |
| Polyamide 6 | PA6 |
| Polyamide 6.6 | PA66 |
| Glass transition temperature | Tg |

The temperature at which the tanδ value relative to the dynamic viscoelasticity in the 10-Hz tensile mode (measured on an Iwamoto Seisakusho model VEF-3) reached a peak was taken as the glass transition temperature.

The weight-average particle size of each core-shell polymer was measured on a Coulter model N-4 (Coulter Electronics).

EXAMPLE 1 PRODUCTION OF CORE-SHELL POLYMER A

A 5-liter polymerization vessel equipped with a reflux condenser was charged with 1,400 g of DIW, 50 g of aqueous (SSS) solution of SSS and 100 g of 1% aqueous solution of SHC. The resultant mixture was heated to 70° C. with stirring under nitrogen.

A first-step monomer mixture (a)(100 g) having the composition specified below was added to the above mixture and, after 10 minutes of stirring for effecting dispersion, seed polymerization was initiated by adding 200 g of 2% aqueous solution of SPS.

| First-step monomer mixture (a) | |
|---|---|
| BA | 1,992 g |
| AlMA | 4 g |
| BGA | 4 g |
| First-step monomer emulsion | |
| First-step monomer mixture (a) | 1,900 g |
| 1% Aqueous solution of SSS | 700 g |
| 1% Aqueous solution of SHC | 100 g |

The first-step monomer emulsion specified above (2,700 g) was then fed continuously over 150 minutes and, after addition of 100 g of feed line washings (water), the resultant mixture was heated to 90° C. and maintained at that temperature for 1 hour for maturation.

After cooling to 70° C. second-step polymerization was effected. Thus, 50 g of 2% aqueous solution of SPS and 50 g of iraconic acid were added and then 650 g of a second-step monomer emulsion having the composition shown below was fed over 120 minutes and, after addition of 100 g of feed line washings (water), the resultant mixture was heated to 90° C. and maintained at that temperature for 1 hour for maturation.

| Second-step monomer emulsion | |
|---|---|
| Second-step monomer MMA | 400 g |
| Second-step monomer EA | 50 g |
| 1% Aqueous solution of SSS | 150 g |
| 1% Aqueous solution of SHC | 50 g |

The reaction mixture was cooled to room temperature and filtered through 300-mesh stainless steel wire gauze to give a core-shell polymer latex with a solid content of 45.8% and a weight-average particle size of 272 nm.

This latex was subjected to freezing and thawing for coagulation and the coagulate was washed with water, and then, after elimination of water dried to give core-shell polymer A.

EXAMPLE 2 PRODUCTION OF CORE-SHELL POLYMER B

Emulsion polymerization was carried out in the same manner as in Example 1 using the charge composition (B) specified in Table 1. The latex obtained was subjected to freezing and thawing for coagulation and the coagulate was washed with water, and then, after elimination of water, and dried to give core-shell polymer B.

EXAMPLE 3 PRODUCTION OF CORE-SHELL POLYMER C

A 5-liter autoclave was charged with 540 g of DIW and 2.4 g of DBES. The mixture was heated to 50° C. with stirring under nitrogen.

St (7.5 g) and 19.5 g of Bd were added and seed polymerization was initiated by adding 0.24 g of CHP and 1.1 g of an activator solution (composed of 5.0 g of SFS, 0.5 g of EDTA, 0.05 g of ferrous sulfate and 5.0 g of DIW).

After completion of the reaction, 1,000 g of DIW was added and then 2,024 g of a monomer emulsion having the composition specified below, 2.4 g. of CHP and 11 g of the same activator solution as mentioned above were continuously fed over 5 hours, 8 hours and 8 hours, respectively, for first-step polymerization.

| First-step monomer emulsion | |
|---|---|
| St | 300 g |
| Bd | 1,200 g |
| DBES | 24 g |
| DIW | 500 g |

The first-step polymerization mixture was heated to 70° C. and second-step polymerization was carried out. Thus, 54 g of 2% aqueous solution of SPS was added and then 631 g of a second-step monomer emulsion having the following composition was fed over 60 minutes.

| Second-step monomer emulsion | |
|---|---|
| MMA | 300 g |
| EA | 37.5 g |
| IA | 37.5 g |
| DBES | 1 g |
| 1% Aqueous solution of SHC | 54 g |
| DIW | 200 g |

The reaction mixture was heated to 90° C., maintained at that temperature for 1 hour for maturation, then cooled to room temperature and filtered through 300-mesh stainless steel wire gauze to give a core-shell polymer latex with a solid content of 46.5% and a weight-average particle size of 240 nm.

This latex was subjected to freezing and thawing for coagulation and the coagulate was washed with water, and then, got rid of water and dried to give core-shell polymer C.

EXAMPLE 4 AND 5

Production of Core-Shell Polymers D and E

Emulsion polymerization was carried out in the same manner as in Example 1 using the charge compositions (D and E) shown in Table 1, followed by coagulation by freezing and thawing, washing with water, removal of water and drying to give core-shell polymers.

These core-shell polymers were each melted by heating in a twin-screw extruder PCM-30 (manufactured by Ikegai Iron Works, Ltd.) under reduced pressure at a cylinder temperature of 220° C. and a die head temperature of 230° C. for dehydration of the dicarboxylic acid. Thus were obtained core-shell polymers D and E.

EXAMPLE 6 PRODUCTION OF POLYAMIDE RESIN COMPOSITION (1)

Polyamide 6 (Amilan 1017, manufactured by Toray Co. Ltd.) (100 parts) and 25 parts of core-shell polymer A produced in Example 1 and dried to a water content of not less than 0.03% were melt-blended with each other using a twin-screw extruder PCM-30 (manufactured by Ikegai Iron Works, Ltd.) at a cylinder temperature of 230° C. and a die head temperature of 230° C. to give polyamide resin composition (1) in a pellet form.

EXAMPLES 7 TO 10

Production of Polyamide Resin Compositions (2) to (5)

Polyamide resin compositions (2), (3), (4) and (5) were produced by proceeding in the same manner as in Example 6 using core-shell polymers B, C, D and E, respectively, in lieu of core-shell polymer A in Example 6.

COMPARATIVE EXAMPLES 1 AND 2

Production of Core-Shell Polymers F and G

Core-shell polymers F and G were produced by proceeding in the same manner as in Example 1 using the compositions (F and G) shown in Table 1.

Core-shell polymer F does not contain —COOH group.

Core-shell polymer G is a product with a monocarboxylic acid copolymerized in the shell phase.

COMPARATIVE EXAMPLES 3 AND 4

Production of Polyamide Resin Compositions (6) and (7)

Polyamide resin compositions (6) and (7) were produced in a pellet form by proceeding in the same manner as in Example 6 using core-shell polymers F and G, respectively, in lieu of core-shell polymer A in Example 6.

COMPARATIVE EXAMPLE 5

Production of Polyamide Resin Composition (8)

Polyamide resin composition (8) was produced in a pellet form by proceeding in the same manner as in Example 6 using a commercially available impact modifier for polyamide resins (core-shell polymer EXL-3386, manufactured by Rohm and Haas Company) in lieu of core-shell polymer A in Example 6.

The toluene-soluble fraction of said commercial product was 10.7% by weight.

EXAMPLE 11 PRODUCTION OF POLYAMIDE RESIN COMPOSITION (10)

Polyamide resin composition (10) was produced in a pellet form by melt-blending 100 parts of polyamide 6.6 (Amilan 3001-N, manufactured by Toray Co. Ltd.) with 25 parts of core-shell polymer A produced in Example 1 and dried to a water content of not more than 0.03% using a twin-screw extruder PCM-30 (manufactured by Ikegai Iron Works, Ltd.) at a cylinder temperature of 250° C. and a die head temperature of 260° C.

EXAMPLES 12 AND 13

Production of Polyamide Resin Compositions (11) and (12)

Polyamide resin compositions (11) and (12) were produced in a pellet form by proceeding in the same manner as in Example 11 using core-shell polymers D and E, respectively, in lieu of core-shell polymer A in Example 11.

EXAMPLE 14 PRODUCTION OF CORE-SHELL POLYMER H

Emulsion polymerization was carried out in the same manner as in Example 1 using the charge composition (H) specified in Table 1. The latex obtained was subjected to freezing and thawing for coagulation and the coagulate was washed with water, and then, after climination of water, dried to give core-shell polymer H.

EXAMPLE 15 PRODUCTION OF POLYAMIDE RESIN COMPOSITION (14)

Polyamide resin composition (14) was produced by proceeding in the same manner as in Example 6 using core-shell polymer H in lieu of core-shell polymer A in Example 6.

EXAMPLE 16 PRODUCTION OF POLYAMIDE RESIN COMPOSITION (15)

Polyamide resin composition (15) was produced in a pellet form by proceeding in the same manner as in Example 11 using core-shell polymer H in lieu of core-shell polymer A in Example 11.

COMPARATIVE EXAMPLES 6 TO 8

Production of Polyamide Resin Compositions

Polyamide resin compositions (16) to (18) were produced in a pellet form by proceeding in the same manner as in Example 11 using core-shell polymer F, G or EXL-3386 in lieu of core-shell polymer A in Example 11.

TEST EXAMPLE

Polyamide resin compositions (1) to (13) each in a pellet form were respectively dried at 120° C. for 4 hours and then molded under the conditions mentioned below using a TS-100 (manufactured by Nissei Plastic Industries, Co. Ltd.) injection molding machine. The moldings were notched by cutting on a milling machine to give Izod impact test specimens ⅛ inch or ¼ inch in thickness, as described in JIS K 7113.

It is to be noted that polyamide resins (9) and (13) are polyamide resins per se, namely polyamide 6 (Amilan 1017C, manufactured by Toray Co. Ltd.) and polyamide 6.6 (Amilan 3001-N, manufactured by Toray Co. Ltd.), respectively.

|  | Cylinder temperature | Nozzle temperature |
|---|---|---|
| Polyamide 6 resin moldings | 240° C. | 250° C. |
| Polyamide 6.6 resin moldings | 270° C. | 280° C. |

These test specimens were tested for impact strength at temperatures of 23° C., 10° C., 0° C., −10° C., −20° C. and -30° C by the method essentially described in JIS K 7113.

The melt viscosity of each polyamide resin molding was measured in terms of Q (flow value) by the method of testing for flow of thermoplastic resins as described in JIS K 7210 using a Shimadzu model CFT-500 flow tester. The results obtained are shown in Table 2 and Table 3.

| Load: | 80 kgf |
|---|---|
| Die shape: | 1 mm in diameter, 2 mm in length |
| Measurement temperature: | |
| for polyamide 6 resin moldings | 250° C. |
| for polyamide 6.6 resin moldings | 280° C. |

For toluene-soluble fraction measurement, 5 g of each core-shell polymer was added to 100 g of toluene and the mixture was allowed to stand at room temperature for 40 hours and then centrifuged on a Hitachi model 70P-72 ultracentrifuge (manufactured by Hitachi Koki Co. Ltd.) for separation at 40,000 rpm for 30 minutes. The supernatant was transferred to a eggplant-shaped flask, the toluene was removed using an evaporator and, after further drying under vacuum at 80° C. for 3 hours, the residue in the eggplant-shaped flask was weighed. The toluene-soluble fraction was calculated as follows:

Toluene-soluble fraction (% by weight) =

$$\frac{\text{Weight (g) of residue in eggplant-shaped flask}}{\text{Weight (g) of core-shell polymer exposed to toluene}} \times 100$$

TABLE 1

| | Example 1 | Example 2 | Example 3 | Example 4 | Example 5 | Comparative Example 1 | Comparative Example 2 | Example 14 |
|---|---|---|---|---|---|---|---|---|
| Core-shell polymer (Weight ratio) | A | B | C | D | E | F | G | H |
| Core phase | 80 | 80 | 80 | 80 | 85 | 80 | 80 | 80 |
| Shell phase | 20 | 20 | 20 | 20 | 15 | 20 | 20 | 20 |
| Composition of core portion (Weight ratio) | | | | | | | | |
| BA | 99.6 | 99.6 | | 99.6 | | 99.6 | 99.6 | 99.6 |
| BGA | 0.2 | 0.2 | 0.2 | 0.2 | 0.2 | 0.2 | 0.2 | 0.2 |
| AlMA | 0.2 | 0.2 | 0.2 | 0.2 | 0.2 | 0.2 | 0.2 | 0.2 |
| 2EHA | | | | | 99.6 | | | |
| Bd | | | 80.0 | | | | | |
| St | | | 19.6 | | | | | |
| Tg (°C.) of core | −39 | −40 | −46 | −39 | −65 | −39 | −40 | −40 |
| Composition of core portion (Weight ratio) | | | | | | | | |
| MMA | 80.0 | 80.0 | 80.0 | 80.0 | 80.0 | 80.0 | 80.0 | 80 |
| EA | 10.0 | 18.0 | 10.0 | 10.0 | 10.0 | 20.0 | 10.0 | 10 |
| MAA | | | | | | | 10.0 | |
| FA | | | | | 10.0 | | | |
| IA | 10.0 | 2 | 10.0 | 10.0 | | | | |
| MAME | | | | | | | | 10 |
| Tg (°C.) of shell portion | 112 | 107 | 111 | 112 | 115 | 106 | 114 | 110 |
| Toluene-soluble | 4.5 | 4.4 | 3.5 | 4.1 | 4.4 | | | 4.7 |

TABLE 1-continued

|  | Example 1 | Example 2 | Example 3 | Example 4 | Example 5 | Comparative Example 1 | Comparative Example 2 | Example 14 |
| --- | --- | --- | --- | --- | --- | --- | --- | --- |
| fraction |  |  |  |  |  |  |  |  |
| Heat Treatment | none | none | none | done | none | none | none | none |

TABLE 2

|  | Example 6 | Example 7 | Example 8 | Example 9 | Example 10 | Comparative Example 3 | Comparative Example 4 | Comparative Example 5 |  | Example 15 |
| --- | --- | --- | --- | --- | --- | --- | --- | --- | --- | --- |
| Polyamide resin molding | (1) | (2) | (3) | (4) | (5) | (6) | (7) | (8) | (9) | (14) |
| a) Core-shell polymer | A | B | C | D | E | F | G | EXL-3386 |  | H |
| b) Polyamide | PA6 | PA6 | PA6 | PA6 | PA6 | PA6 | PA6 | PA6 | PA6 | PA6 |
| Compounding ratio a)/b) | 80/20 | 80/20 | 80/20 | 80/20 | 80/20 | 80/20 | 80/20 | 80/20 | 100/0 | 80/20 |
| Notched Izod Impact Strength (kgfcm/cm) thickness ⅛ inch |  |  |  |  |  |  |  |  |  |  |
| 23(°C.) | 95.1 | 89.4 | 90.1 | 102 | 85.1 | 15.7 | 81.5 | 80.4 | 7.8 | 90.2 |
| 10(°C.) | 81.2 | 85.3 | 88.3 | 83.2 | 78.2 | 14.3 | 29.8 | 25.1 | 7.2 | 86.5 |
| 0(°C.) | 76.5 | 65.1 | 68.1 | 81.2 | 35.4 | 12.2 | 24.5 | 23.1 | 6.5 | 81.2 |
| −10(°C.) | 43.2 | 27.8 | 27.2 | 76.5 | 27.5 | 11.9 | 19.4 | 20.7 | 6.7 | 30.5 |
| −20(°C.) | 30.5 | 26.6 | 26.5 | 32.4 | 26.1 | 9.9 | 16 | 18.3 | 6.4 | 24.1 |
| −30(°C.) | 26.7 | 21.3 | 24.3 | 28.1 | 23.8 | 9.7 | 13.4 | 15.4 | 5.8 | 20.6 |
| Thickness ¼ inch |  |  |  |  |  |  |  |  |  |  |
| 23(°C.) | 76.5 | 75.2 | 70.5 | 81.2 | 35.1 | 14.5 | 24.6 | 23.8 | 5.4 | 79.1 |
| 10(°C.) | 32.6 | 27.3 | 29.3 | 41.9 | 30.2 | 12.9 | 20.8 | 20.4 | 4.8 | 25.4 |
| 0(°C.) | 29.8 | 25.3 | 25.3 | 30.8 | 28.7 | 11 | 17.5 | 17.2 | 4.3 | 23.6 |
| −10(°C.) | 26.3 | 23.9 | 21.3 | 28.5 | 27.2 | 10.4 | 14.6 | 15.1 | 4.1 | 21.5 |
| −20(°C.) | 25.1 | 21.1 | 19.6 | 27.6 | 24.3 | 7.9 | 13 | 12.5 | 4.2 | 19.4 |
| −30(°C.) | 21.8 | 18.6 | 18.2 | 26.7 | 25.3 | 8.1 | 10.9 | 10.1 | 4 | 16.2 |
| Flow tester Q value (ml/s) | 0.41 | 0.43 | 0.43 | 0.49 | 1.14 | 0.65 | 0.12 | 0.16 | 1.88 | 0.43 |

PA6: polyamide 6

TABLE 3

|  | Example 11 | Example 12 | Example 13 |  | Example 16 | Comparative Example 6 | Comparative Example 7 | Comparative Example 8 |
| --- | --- | --- | --- | --- | --- | --- | --- | --- |
| Polyamide resin molding | (10) | (11) | (12) | (13) | (15) | (16) | (17) | (18) |
| a) Core-shell polymer | A | D | E |  | H | F | G | EXL-3386 |
| b) Polyamide | PA6.6 | PA6.6 | PA6.6 | PA6.6 | PA6.6 | PA6.6 | PA6.6 | PA6.6 |
| Compounding ratio a)/b) | 80/20 | 80/20 | 80/20 | 100/0 | 80/20 | 80/20 | 80/20 | 80/20 |
| Notched Izod Impact Strength (kgfcm/cm) thickness ⅛ inch |  |  |  |  |  |  |  |  |
| 23(°C.) | 94.2 | 94.2 | 83.4 | 5.4 | 90.8 | 19.5 | 21.0 | 20.4 |
| 10(°C.) | 42.2 | 42.6 | 30.5 | 5.2 | 41.3 | 15.4 | 18.4 | 18.2 |
| 0(°C.) | 29.8 | 30.1 | 28.7 | 4.9 | 28.4 | 13.4 | 16.4 | 16.2 |
| −10(°C.) | 25.6 | 27.9 | 26.4 | 4.6 | 25.4 | 12.1 | 15.7 | 14.8 |
| −20(°C.) | 23.1 | 24.9 | 24.6 | 4.3 | 23.6 | 9.7 | 13.2 | 13.7 |
| −30(°C.) | 21.9 | 25.7 | 21.8 | 4.5 | 22.1 | 8.4 | 12.4 | 11.7 |
| Thickness ¼ inch |  |  |  |  |  |  |  |  |
| 23(°C.) | 27.4 | 28.6 | 26.8 | 4.8 | 27.6 | 17.5 | 17.5 | 16.7 |
| 10(°C.) | 26.1 | 24.6 | 24.7 | 4.5 | 25.4 | 16.4 | 16.7 | 15.4 |
| 0(°C.) | 24.6 | 23.1 | 23.1 | 4.1 | 24.1 | 14.2 | 15.0 | 14.7 |
| −10(°C.) | 22.8 | 22.8 | 21.8 | 4.2 | 22.1 | 13.4 | 14.7 | 13.4 |
| −20(°C.) | 21.6 | 19.2 | 18.6 | 3.8 | 20.9 | 12.0 | 12.1 | 11.8 |
| −30(°C.) | 19.4 | 18.4 | 17.5 | 3.6 | 18.7 | 9.1 | 9.7 | 9.7 |
| Flow tester Q value (ml/s) | 0.48 | 0.46 | 0.92 | 2.73 | 0.43 | 1.12 | 1.01 | 0.97 |

PA6.6: polyamide 6.6

What we claimed is:

1. A polyamide resin composition which comprises:
(a) 3 to 40 weight % of a core-shell polymer which comprises:
   (1) a core phase which is a rubbery polymer having a glass transition temperature not higher than −30° C. and which is formed by polymerizing an alkyl acrylate monomer containing 2 to 8 carbon atoms in the alkyl moiety, in the presence of an alkane polyol acrylate as a cross-linking monomer and an allyl (meth) acrylate as a grafting monomer, and
   (2) a shell phase which is a glassy polymer having a glass transition temperature not lower than 40° C. and which is formed by copolymerizing methyl methacrylate and 10 to 18 weight % of an alkyl acrylate having up to 4 carbon atoms in the alkyl moiety with fumaric acid, itaconic acid or ethyl maleate, the amount of the core phase being from 50 to 90 weight % based on the whole core-shell polymer and the amount of the shell phase being from 10 to 50 weight % based on the whole core-shell polymer, and the toluene-soluble fraction of the core-shell polymer accounting for not more than 10% by weight; and (b) a polyamide resin.

2. A polyamide resin composition as claimed in claim 1, wherein the alkyl acrylate monomer containing 2 to 8 carbon atoms in the alkyl moiety of the core-shell polymer is ethyl acrylate, butyl acrylate, 2-ethylhexyl acrylate or a mixture thereof.

3. A polyamide resin composition as claimed in claim 1, wherein the alkyl acrylate monomer containing 2 to 8 carbon atoms in the alkyl moiety of the core-shell polymer is butyl acrylate.

4. A polyamide resin composition as claimed in claim 1, wherein the alkane polyol acrylate as a cross-linking monomer of the core-shell polymer is 1,4-butylene glycol diacrylate.

5. A polyamide resin composition as claimed in claim 1, wherein the allyl (meth) acrylate as the grafting monomer is allyl methacrylate.

6. A polyamide resin composition as claimed in claim 1, wherein the alkyl acrylate having up to 4 carbon atoms in the alkyl moiety is ethyl acrylate.

7. A polyamide resin composition as claimed in claim 1, wherein the amount of the cross-linking monomer and the grafting monomer are respectively in the range of 0.01 to 5% by weight based on the core portion.

8. A polyamide resin composition as claimed in claim 1, wherein the amount of the cross-linking monomer and the grafting monomer are respectively in the range of 0.1 to 2% by weight based on the core portion.

9. A polyamide resin composition as claimed in claim 1, wherein the amount of fumaric acid, itaconic acid or ethyl maleate of the core-shell polymer is in the range of 1 to 20% by weight based on the shell portion.

10. A polyamide resin composition as claimed in claim 1, wherein the toluene-soluble fraction of the core-shell polymer accounts for not more than 5% by weight.

11. A polyamide resin composition as claimed in claim 1, wherein the polyamide resin is polyamide 6 and/or polyamide 6.6.

12. A polyamide resin composition as claimed in claim 1, wherein the amount of the core-shell polymer is in the range of 5 to 25% by weight based on the polyamide resin composition.

* * * * *